(12) United States Patent
Flemming et al.

(10) Patent No.: US 8,770,512 B2
(45) Date of Patent: Jul. 8, 2014

(54) PASSIVE CONTROL OF ICE SHEDDING

(75) Inventors: Robert James Flemming, Trumbull, CT (US); Eric G. Olsen, Southbury, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 179 days.

(21) Appl. No.: 13/343,083

(22) Filed: Jan. 4, 2012

(65) Prior Publication Data

US 2012/0181389 A1 Jul. 19, 2012

Related U.S. Application Data

(60) Provisional application No. 61/432,937, filed on Jan. 14, 2011.

(51) Int. Cl.
*B64D 33/02* (2006.01)
(52) U.S. Cl.
USPC .............. 244/53 B; 244/134 R; 60/39.092
(58) Field of Classification Search
USPC ........ 244/53 B, 58, 134 E, 134 R; 60/39.092, 60/39.093; 415/121.2; 137/15.1
See application file for complete search history.

(56) References Cited

U.S. PATENT DOCUMENTS

| | | | |
|---|---|---|---|
| 2,504,684 A | 4/1950 | Harper | |
| 2,970,794 A | 2/1961 | Johnson | |
| 3,794,444 A | 2/1974 | Campbell et al. | |
| 4,494,715 A | 1/1985 | Weisend, Jr. | |
| 4,613,102 A | 9/1986 | Kageorge | |
| 4,706,911 A | 11/1987 | Briscoe et al. | |
| 4,776,755 A * | 10/1988 | Bjorkestam et al. | 415/121.2 |
| 4,836,474 A | 6/1989 | Briscoe et al. | |
| 4,852,343 A | 8/1989 | Norris et al. | |
| 5,014,606 A | 5/1991 | Steiner et al. | |
| 5,182,944 A | 2/1993 | Brunnenkant | |
| 5,490,644 A * | 2/1996 | Koncsek et al. | 244/53 B |
| 5,553,814 A | 9/1996 | Rauckhorst, III et al. | |
| 5,752,674 A | 5/1998 | Mears et al. | |
| 6,250,588 B1 | 6/2001 | Numbers et al. | |
| 6,848,652 B2 | 2/2005 | Palin et al. | |
| 6,939,392 B2 | 9/2005 | Huang et al. | |
| 7,131,815 B2 | 11/2006 | Allford et al. | |
| 7,594,627 B2 | 9/2009 | Bourgault | |

(Continued)

FOREIGN PATENT DOCUMENTS

| | | |
|---|---|---|
| EP | 2399828 A1 | 12/2011 |
| WO | 2006107741 A2 | 10/2006 |
| WO | 2006113388 A2 | 10/2006 |

OTHER PUBLICATIONS

European Search Report; European Application No. 12151140.6-2422; European Filing Date: Apr. 11, 2012; Date of mailing: Apr. 12, 2012.

*Primary Examiner* — Timothy D Collins
*Assistant Examiner* — Nicholas McFall
(74) *Attorney, Agent, or Firm* — Cantor Colburn LLP

(57) ABSTRACT

A plate including a body with an aft face at an aft portion of the body, which is attachable to a leading edge of an ice accretion surface such that the body protrudes substantially in a forward direction from the leading edge, and a forward face opposite the aft face, which extends between opposing surfaces of the body and which is oriented substantially perpendicularly with respect to the forward direction and a predominant flow direction of air flowing past the leading edge.

9 Claims, 1 Drawing Sheet

(56) References Cited

U.S. PATENT DOCUMENTS

| | | |
|---|---|---|
| 2004/0194627 A1 | 10/2004 | Huang et al. |
| 2006/0226292 A1 | 10/2006 | Houlihan et al. |
| 2009/0272850 A1 | 11/2009 | Rainous et al. |
| 2010/0096507 A1 | 4/2010 | Villinger |
| 2010/0101206 A1 | 4/2010 | Haehner et al. |
| 2010/0108814 A1 | 5/2010 | Etling |
| 2010/0163678 A1 | 7/2010 | Gregory et al. |

\* cited by examiner

PASSIVE CONTROL OF ICE SHEDDING

CROSS-REFERENCE TO RELATED APPLICATION

This application claims the benefit of priority to U.S. Provisional Application 61/432,937, which was filed on Jan. 14, 2011 and entitled, "Passive Control of Ice Shedding," the entire contents of which are incorporated herein by reference.

BACKGROUND OF THE INVENTION

The subject matter disclosed herein relates to passive control of ice shedding from a helicopter.

For certain types of helicopters, ice can form on a leading edge of an engine air inlet and can shed during flight. If the pieces of shed ice are large enough, there is a possibility of damage to other helicopter components such as antennas and the tail rotor. Ice may also form on the inner walls of the air inlet duct, whereby shedding may cause flow blockages if, again, the pieces of shed ice are large enough.

Active ice protection involves the use of heat or a similar energy source to cause melting or fracturing of accreted ice so that the shed ice does not become large enough to damage antennas or the tail rotor or block the inlet duct. Unfortunately, active ice protection also complicates a helicopter design. That is, active controls add to the power requirements, add significant weight and impact reliability and maintainability metrics.

BRIEF DESCRIPTION OF THE INVENTION

According to an aspect of the invention, a plate is provided and includes a body, an aft face at an aft portion of the body, which is attachable to a leading edge of an ice accretion surface such that the body protrudes substantially in a forward direction from the leading edge, and a forward face opposite the aft face, which extends between opposing surfaces of the body and which is oriented substantially perpendicularly with respect to the forward direction and a predominant flow direction of air flowing past the leading edge.

According to another aspect of the invention, a plate is disposed within an engine air inlet of a rotor-machine and includes a retention device coupled to the plate to temporarily hold ice thereto, the retention device including one or more of a straight, curved, bent or looped rod coupled to the plate.

According to another aspect of the invention, a helicopter is provided and includes a fuselage including a cabin and a main rotor pylon, an engine air inlet having a leading edge and being coupled to the fuselage proximate to a connection of the main rotor pylon and the cabin and a plate protruding from the leading edge of the engine air inlet and having a forward face, which is oriented substantially perpendicularly with respect to a predominant flow direction of air entering the engine air inlet.

According to yet another aspect of the invention, an engine air inlet is provided and includes an inner wall, an outer wall terminating in a leading edge, which is coupled to the inner wall to define an inlet space extending in an aft direction from the leading edge, a splitter, having a leading edge, disposed within the inlet space between the inner wall and the outer wall and at least one plate protruding in a forward direction from one or more of the respective leading edges of the outer wall and the splitter and having a forward face, which is oriented substantially perpendicularly with respect to the aft and forward directions.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

With reference to FIGS. 1-4, a passive approach to control the size of shed ice from an aircraft, rotor-machine or rotor-craft, e.g., accreted ice from a helicopter, is provided whereby ice is permitted to accrete on forward facing surfaces including a leading edge of an engine air inlet and inlet surfaces that have one or more forward-facing projections. As mentioned above, ice on an engine air inlet leading edge can shed as a single piece around the side of the helicopter fuselage and impact other helicopter components such as antennas and tail rotor components. Ice on the leading edge of the engine air inlet can also shed into the inlet, impacting other portions of the inlet including protective screens. In accordance with aspects, however, installation of one or more plates, fences, splitters or dividers in the area of the ice accretion and substantially aligned with flow streamlines can segment the accreted ice into smaller, less damaging pieces or cause stress concentrations in the ice formation resulting in the fracture of the shed ice before it can impact other parts of the helicopter. In addition, one or more straight, curved, bent or looped rods may be provided around which ice can accrete to thereby secure the accreted ice and to prevent the shedding of large ice particles.

Figure 1:
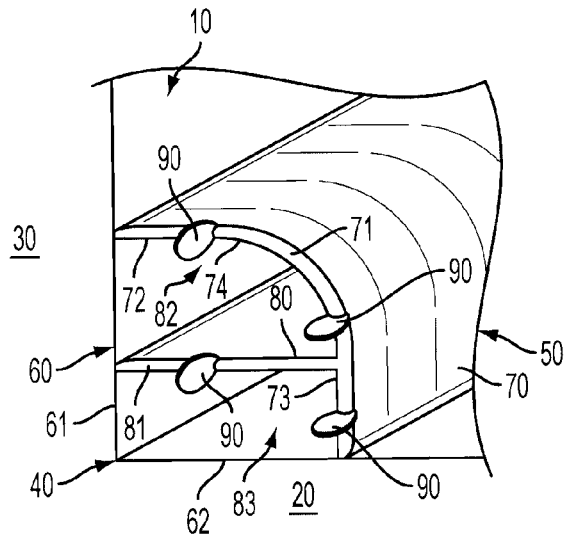
FIG. 1 is a perspective view of an engine air inlet.

As shown in FIG. 1, a helicopter 10 is provided and includes a first fuselage portion 20 defining a cabin and a second fuselage portion 30 defining a main rotor pylon. The cabin is sized and shaped to permit a pilot and, in some cases, additional operators and/or passengers to fit therein. The main rotor pylon is disposed at a top of the cabin and covers components of the main rotor drive system. At a confluence of the main rotor pylon and the cabin, the first fuselage portion 20 and the second fuselage portion 30 meet and form a shoulder 40 at which an engine air inlet 50 is disposed.

The engine air inlet 50 includes an inner wall 60, an outer wall 70 and, in some cases, a splitter 80. The inner wall 60 is formed of local segments of the first fuselage portion 20 and the second fuselage portion 30, such that the inner wall 60 includes a substantially vertical component 61 and a substantially lateral component 62. The outer wall 70 includes an inner surface and an outer surface that terminate at a common leading edge 71, which is defined relative to a direction a flow of air into the engine air inlet 50. The outer wall 70 is coupled to the inner wall 60 to define an inlet space extending in an aft direction from the leading edge 71. The splitter 80 has a leading edge 81 and is disposed within the inlet space between the inner wall 60 and the outer wall 70 to divide the inlet space and to separate an engine air pathway 82 from a cooling air pathway 83.

The outer wall 70 includes an upper wall 72, which is substantially aligned with the splitter 80 and the lateral component 62 of the inner wall 60, a sidewall 73, which is substantially aligned with the vertical component 61 of the inner wall 60 and a curved corner section 74 to which the upper wall 72 and the sidewall 73 are connected. The leading edge 71 extends over substantially the entire lengths of the upper wall 72, the sidewall 73 and the curved corner section 74. Similarly, the leading edge 81 extends over substantially the entire length of the splitter 80.

Figure 2:
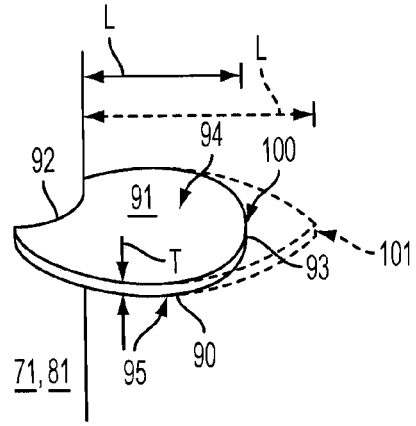
FIG. 2 is an enlarged perspective view of a leading edge of the engine air inlet of FIG. 1.
Figure 3:
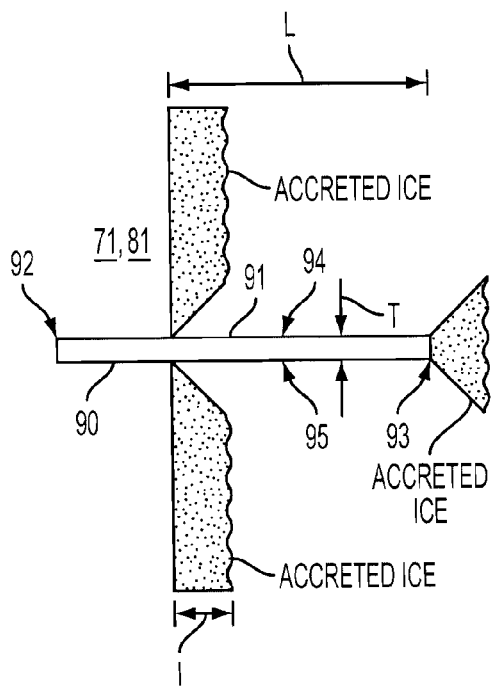
FIG. 3 is a side view of accreted ice in accordance with embodiments.

At least one ore more plates 90 protrude from the leading edge of the engine air inlet 50. That is, each of the one or more plates 90 protrudes from the leading edge 71 and/or the leading edge 81 of the splitter 80. As shown in FIGS. 2 and 3, each plate 90 includes a body 91, an aft face 92 and a forward face 93. The aft face 92 is disposed at an aft portion of the body 91 and is attachable to the leading edge 71 or 81 of an ice accretion surface, such as the leading edge of the engine air inlet 50 of a helicopter. By way of the attachment, the body 91 protrudes substantially in a forward direction from the leading edge 71 or 81. The forward face 93 faces forwardly from the body 91, is disposed opposite the aft face 92 and extends between opposing lower and upper surfaces 94 and 95 of the body 91. In accordance with embodiments, the forward face 93 may be oriented substantially perpendicularly with respect to the forward direction and a predominant flow direction of air flowing past the leading edge 71 or 81 along, e.g., the engine air pathway 82 or the cooling air pathway 83.

The one or more of the plates 90 may be disposed along the lengths of the leading edges 71 and 81 and the splitter 80. In a particular exemplary embodiment, the plate 90 may be disposed along the leading edge 71 of the sidewall 73 proximate to or just below the curved corner section 74. In any case, the plate 90 may be aligned in any orientation relative to the horizon but the forward face 93 should be perpendicular to the predominant flow direction of air flowing past the leading edge 71 or 81 along, e.g., the engine air pathway 82 or the cooling air pathway 83.

In accordance with embodiments, each plate 90 may have a length, L, measured from the leading edge 71 or 81 that is sufficient to have the plate 90 project from the leading edge 71 or 81 by a distance that is equal to or greater than an expected ice thickness, I. For example, the length, L, may be about 3 inches (7.6 cm) with the expected ice thickness, I, equal to, less than or significantly less than that length. A thickness, T, of each plate 90 as measured between the opposing lower and upper surfaces 94 and 95 and at the forward face 93 may be about 0.2 inches (0.5 cm) or more or less. In this way, as shown in FIG. 3, ice may accrete on the leading edge 71 or 81 and on the forward face 93. However, at the plate 90, the accreted ice of the leading edge 71 or 81 on either side of the plate 90 will separate from itself and from the accreted ice on the forward face 93. As such, the accreted ice will not tend to grow large enough (i.e., about 1 lb or more) to cause tail rotor damage or inlet blockage upon shedding.

The components of the engine air inlet 50, including the outer wall 70 and the splitter 80, have airfoil-shaped cross-sections in that each has an increasing thickness as one proceeds along the aft direction from the leading edges 71 and 81, respectively, until a predefined thickness is reached at which the thickness begins to increase relatively slowly and then stops increasing. Thus, the leading edges 71 and 81 may be curved. Each plate 90 may be formed to mimic this curvature although the plate 90 will bulge away from the leading edges 71 and 81 between the aft face 92 and the forward face 93 and may include a rounded leading edge 100. In alternate embodiments, however, each plate 90 may have a curvature and may further include a sharp leading edge 101.

Figure 4:
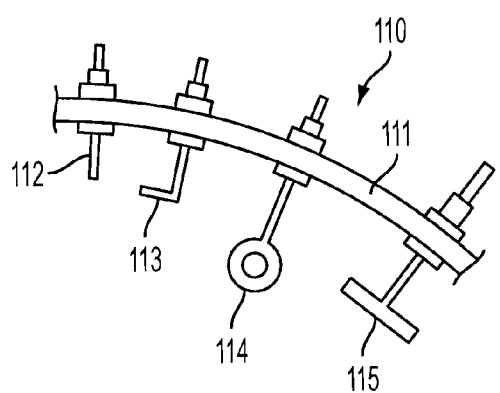
FIG. 4 is an enlarged view of a retention device in accordance with further embodiments.

With reference to FIG. 4, a retention device 110 may be coupled to an inner duct plate 111 for disposition within a duct formed by the engine air inlet 50 to temporarily hold ice thereto. That is, the retention device 110 prevents or limits the shedding of the ice even where such ice is limited from growing as described above. The retention device 110 may include one or more of a straight rod 112, a curved or bent rod 113 and/or a looped rod 114, which are coupled to the inner duct plate 111 by, for example, nut and bolt fasteners. The various rods of the retention device 110 may be arranged in staggered rows and may have varying lengths.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An engine air inlet, comprising:
   an inner wall;
   an outer wall terminating in a leading edge, which is coupled to the inner wall to define an inlet space extending in an aft direction from the leading edge;
   a splitter, having a leading edge, disposed within the inlet space between the inner wall and the outer wall; and
   at least one plate protruding in a forward direction from one or more of the respective leading edges of the outer wall and the splitter and having a forward face, which is oriented substantially perpendicularly with respect to the aft and forward directions.

2. The engine air inlet according to claim 1, wherein the inner wall has substantially lateral and vertical components and the outer wall comprises:
   an upper wall substantially aligned with the splitter and the inner wall lateral component;
   a sidewall substantially aligned with the inner wall vertical component; and
   a curved corner section at which the upper wall and the sidewall meet.

3. The engine air inlet according to claim 2, wherein the at least one plate protrudes from the respective leading edges of the outer wall at the upper wall, the sidewall and the corner section and the splitter.

4. The engine air inlet according to claim 2, wherein the at least one plate protrudes from the leading edge of the sidewall proximate to the curved corner section.

5. The engine air inlet according to claim 1, wherein the splitter divides the inlet space to separate an engine air pathway from a cooling air pathway.

6. The engine air inlet according to claim 1, wherein the respective leading edges of the outer wall and the splitter have airfoil-shaped cross-sections.

7. The engine air inlet according to claim 6, wherein a cross-section of the plate mimics the airfoil-shaped cross-section of the leading edges.

8. The engine air inlet according to claim 1, wherein the forward face has one of a rounded leading edge and a sharp leading edge.

9. The engine air inlet according to claim 1, further comprising a retention device coupled to an inner duct plate disposed within the inlet space to temporarily hold ice thereto, the retention device comprising one or more of a straight, curved, bent, or looped rod coupled to the plate.

* * * * *